United States Patent [19]

Kletecka et al.

[11] Patent Number: 5,240,977
[45] Date of Patent: Aug. 31, 1993

[54] MULTI-COMPONENT STABILIZER SYSTEM FOR POLYOLEFINS PIGMENTED WITH AZO AND DISAZO PIGMENTS

[75] Inventors: George Kletecka, Fairview Park; John T. Lai, Broadview Heights; Pyong-Nae Son, Akron, all of Ohio

[73] Assignee: The B.F. Goodrich Company, Akron, Ohio

[21] Appl. No.: 659,212

[22] Filed: Feb. 22, 1991

Related U.S. Application Data

[63] Continuation-in-part of Ser. No. 468,522, Jan. 23, 1990.

[51] Int. Cl.$^5$ ............................................. C08K 5/34
[52] U.S. Cl. ................................... 524/100; 524/291
[58] Field of Search ............................. 524/100, 291

[56] References Cited

U.S. PATENT DOCUMENTS 3,901,848  8/1975  Dibattista et al. .................. 524/125
4,480,092  10/1984  Lai et al. ............................ 544/113

OTHER PUBLICATIONS

Klemchuck, "Influence of Pigments on Light Stability of Polymers", Polymer Photochemistry, 3, (1983), 1–27.
Wishman, "Stabilization of Polypropylene Fibers", (Phillips Fibers Corporation), Greenville, S.C.

Primary Examiner—Kriellion S. Morgan
Attorney, Agent, or Firm—Mary Ann Tucker

[57] ABSTRACT

Excellent color stabilization as well as fiber integrity is obtained in bright sunlight at relatively high temperature, in polyolefin (PO) articles pigmented with red, yellow, and orange azo and disazo pigments, by combining the pigment with two 'large molecule' primary stabilizers, the first an oxo-piperazinyl-triazine based (PIP-T) hindered amine light stabilizer (HALS), and the second, a 3,5-disubstituted-tert-butyl-4-hydroxybenzoate (3,5-DHBZ). The first contains at least two polysubstituted piperazinone rings in its molecule; the second is a hindered phenol with an ester group in the paraposition. Stabilization of the PO's color is obtained for as long as the PO articles themselves are stabilized by the combination of primary stabilizers. With the combination, the pigmented articles are not only thermooxidatively and light-stabilized, but there is exceptionally low color fade. Because fibers may be extruded twice for better distribution of pigment, a small amount, no more than 0.1 phr of secondary melt-stabilizers, may be used. Blue- green- red- orange- and yellow-pigmented PO articles exhibit less than a ±3 change in color (color fading) due to degradation of the pigment, over the useful life of the articles, or a period of exposure resulting in absorption of 1240 Kjoules. Such exposure of pigmented articles, deemed equivalent to normal outdoor use over a period of more than 10 years, results in essentially no visible loss of color due to degradation of the pigment.

27 Claims, 3 Drawing Sheets

MULTI-COMPONENT STABILIZER SYSTEM FOR POLYOLEFINS PIGMENTED WITH AZO AND DISAZO PIGMENTS

CROSS-REFERENCE TO RELATED APPLICATIONS

This application is a continuation-in-part of Ser. No. 07/468,522 filed Jan. 23, 1990.

BACKGROUND OF THE INVENTION

Over the past decade, the use of a wide variety of pigmented thermoformed shaped articles including molded and extruded articles, has grown apace despite the known tendency of such articles to change color long before they lose their integrity. A large proportion of such articles are formed from stabilized polyolefins, and other normally solid predominantly ethylene- and propylene-containing copolymers (together referred to hereafter as "PO" for brevity), and are used for a host of different applications. Providing such articles with adequate stabilization against photooxidative degradation is a difficult and complicated problem (see "The Photooxidative Degradation of Polypropylene. Part II. Photostabilization Mechanisms" by Carlsson D. J. and Wiles, D. M. *J. Macromol. Sci.—Rev. Macromol. Chem.*, C14(2), 155–192 (1976)). Whether molded or extruded, whether in thick sections or in thin (such as fibers and sheets) loss of color is a particularly acute problem for PO pigmented with azo and disazo pigments (together referred to herein as "azo pigments") which in most other respects are ideal pigments for polyethylene (PE) and polypropylene (PP). Typical of such azo pigments is Red 144 (common name). It is used in huge (tons) quantities to pigment PO.

Retention of colors red, yellow, and orange, and shades of these colors, derived from azo pigments in articles exposed to sunlight over their useful life, is of great practical value in molded PO household goods, and in clothing made from woven or non-woven fabrics of the pigmented PO fibers or sheet. But Red 144, Orange 34 and Yellow 93 are known prodegradants; and, PO pigmented with these pigments, not only degrades the PO but it loses its pigmentation due to chemical degradation of the pigment even before the PO itself is degraded past the point where the articles serve their intended use.

To combat the problem of color fading, a better solution is constantly being sought to decelerate color loss which is at least as important as stabilization of the mass of the PO. With particular respect to Red 144-pigmented PP articles which are in high demand, the use of Red 144 both hastens their degradation when exposed to sunlight, and degrades their physical properties over time. The combined effects of such degradation result in a two-pronged attack on the longevity of the articles in normal use, thus vitiating their marketability.

In particular, fabrics made with Red 144-pigmented PP fibers and stabilized with hindered amine light stabilizers (HALS), are especially popular in automobiles, boats, outdoor clothing and other such uses where the fibers degrade at such an unacceptably high rate upon exposure to sunlight, that red articles are soon transformed into non-uniformly colored articles sporting a wide spectrum of unwanted shades of pink and orange. The obvious way to cope with this color degradation problem is to use far more pigment than is required to provide the desired color, so that upon suffering the expected color degradation, the coloration of the remaining non-degraded pigment will maintain acceptable, if not the original, color. Except that 'loading up' the HALS-stabilized fibers with more Red 144 or other azo pigment generates a high proclivity towards reaction of pigment with the commonly used HALS, and other additives such as antioxidants ("AO"s) and antiozonants, used to provide melt-stability to the PP. Further, increasing the concentration of pigment above about 1 phr may produce "blooming" of the pigment long before degradation of either the pigment or the fiber.

This invention particularly relates to the stabilization of shaped articles of PO, specifically of PE and PP articles colored with azo pigments which provide colors across the entire visible spectrum; more particularly, it relates to those pigments which provide either a red, orange, brown, or yellow color, and various shades thereof.

It is known that several stabilizers, particularly the HALS, by themselves, provide excellent stabilization of PO to heat, light and ultraviolet radiation, and, some hindered phenol stabilizers are antioxidants which provide both excellent thermoxidative stabilization, and light stabilization of PO, but such stabilization does not extend to that of color in azo-pigmented PO. For example, a hindered piperidyl compound such as is commercially available as Chimassorb 944, has been combined with a benzoate type stabilizer such as 3,5-disubstituted-4-hydroxybenzoate (generically referred to as "3,5-DHBZ"), and a phosphite commercially available as Ultranox (see Japanese publication JP-230401 (1987) to Sumitomo Chem Ind KK). But there is no indication that such a combination might have been notably effective to stabilize any pigment or dye.

It is also known that numerous pigments for PO, by themselves, provide a significant level of stabilization to PO, but there are many which have no noticeable effect on stability, and still others which accelerate degradation, that is, are prodegradants. To date, the only reliable method of determining to which group a pigment belongs, is by actually testing it in a particular substrate of interest. It is known, for example, a pigment which is a stabilizer in PP may be a prodegradant in a polyacetal.

Azo pigments are known to have good color stability. They also provide some measure of light stability by virtue of their ability to block the path of radiation, thus shielding the azo-pigmented polymer. Such small measure of light stabilization is observed in PP at about 0.4 phr. However, in combination with a stabilizing amount of a known HALS primary stabilizer, which functions as a "radical trap" stabilizer, stabilization provided by 0.6 phr (for which data is provided herein) and as much as 1 phr, of an azo pigment is not substantial.

By a "primary" stabilizer, I refer to one which provides either long term thermoxidative stability during conditions to be encountered during use, or, UV light stability in bright, direct sunlight. Melt extrusion stability, especially for fibers of PO, is provided by a secondary stabilizer. Though the present invention does not require the use of any secondary stabilizer, in those instances, for example in fiber-spinning, where the melt is extruded at about 270° C. (for PP fibers) more than once to obtain better pigment distribution, the PO may contain a small amount, no more than 0.1 phr of a melt (or "process") stabilizer.

Typically, several additives are combined in PP before it is thermoformed, whether spun into fiber, injection molded, blow molded, extruded, etc., each additive being specifically designed to provide a different zone of stabilization, the main zones being (a) melt extrusion stability, (b) long term thermal stability during conditions expected to be encountered during use, (c) uv light stability in bright direct sunlight, and by no means of least importance, (d) stable tinctorial strength to maintain the desired color. Combining several additives known to be effective for each purpose, in PP articles is not likely to produce the desired results because of objectionable side effects due to interaction between the additives.

For example, thiodipropionate compounds such as dilauryl (DLTDP) and distearyl (DSTDP) help control melt-stability despite an odor problem, and certain phosphites control melt flow while depressing the tendency of PP fibers to yellow because the fibers usually contain a hindered phenol AO. The hindered phenol AO increases long term stability but accelerates yellowing. It is known that a hindered phenol AO and a thiodiproionate are most effective when used together. Certain HALS provide not only excellent uv stability but also such good long term thermal stability that the PP fibers will outlast some of the pigments used to color them. Yet a HALS is typically combined with a hindered phenol and a phosphite.

Conventional wisdom dictates that if fibers stabilized with one or more stabilizers and a particular pigment meet the expectations of stability in the marketplace, then molded and extruded articles other than fibers will also be satisfactorily stabilized. The opposite is not true. Therefore, pigments are selected with an eye to their effect upon the processing of PP fibers, the stability requirements of the end product, the pigment's interaction with the other additives to be used, the color requirements, and the cost of producing the pigmented PP fibers. The intense thrust towards using inexpensive PP fibers in the automobile industry where the color red is in high demand, decreed that, despite its high cost, Red 144 be used, because of its intense tinctorial strength and color stability; and, that Red 144 be combined with a compatible uv stabilizer. I found that one of the most damaging factors in the stability of Red 144-pigmented fibers was their interaction with the HALS used.

In my U.S. patent application Ser. No. 07/352,519 filed May 16, 1989, I claimed the discovery that N-(substituted)-α-(3,5-dialkyl-4-hydroxyphenyl)-α,α-disubstituted acetamides ("3,5-DHPZNA") in which one of the substituents on the N atom is a 2-piperazinone group, essentially by itself, except for a melt-stabilizing quantity of a secondary stabilizer, provided excellent discoloration resistance to Red 144-pigmented fibers of PP. It was known that the 3,5-DHPZNA by itself was a good uv stabilizer, as disclosed in U.S. Pat. No. 4,780,495 to John Lai. Surprisingly, when plaques (because they are most conveniently prepared) of Red 144-pigmented PP were tested, they were found to deteriorate rapidly. The Red 144-pigmented fibers were found not to.

The commercial use of red PP fibers requires that the color stability of the PP fiber be such that it equals the useful life of a fabric or other article containing the fiber, which article is exposed to heat and light. Because the stabilizers used generally affect color though they are not regarded as colorants, and, pigments affect thermal and uv light stability even if not known to have such activity, one cannot estimate what the net effect of the interactions might be. (see "Influence of Pigments on the Light Stability of Polymers: A Critical Review" by Peter P. Klemchuk, *Polymer Photochemistry* 3 pg 1-27, 1983).

I continued my tests with numerous combinations of stabilizers in Red 144- and other azo-pigmented fibers, screening the samples to determine whether an unacceptable level of color loss was obtained before the fibers disintegrated. It was unimportant whether the combinations were of a primary with a secondary stabilizer, or, of co-primary stabilizers. The effectiveness of each combination was measured by the degree of degradation of the pigmented fibers both by visual observation, and by "scratch testing" (described herebelow) the surface of exposed fibers.

Fiber degradation is a phenomenon which is easily visible to the naked eye upon inspection of a degrading pigmented yarn exposed either in a Weather-O-Meter in the presence of moisture, or, to bright sun (tests are conducted in the Florida sun) under ambient conditions of humidity. Unstabilized Red-144 pigmented PP fibers exposed to the Florida sun show no fading because the pigmented fibers degrade far more rapidly than the pigment, which results in continual sloughing off of layers of fiber, exposing bright undegraded pigment. Degradation of stabilized fiber is characterized by (i) a fuzzy, peach-skin-like appearance of the surface of the fabric (made with the pigmented fibers), and (ii) the problem of fading color.

For the simple reason that a large volume of azo-pigmented PP goods are either extruded or molded, one way or the other, there was an urgent need to find an effective stabilizer system which would provide such articles, as well as fibers, with adequate longevity under light-degrading conditions. To this end I searched for the appropriate HALS and for a compatible and effective co-stabilizer or "synergist" which might, in combination, provide the desired stabilization. Since there was no indication whether such a synergist should be, or might likely be either an AO or a uv-absorber, the search had to consider both.

As one would expect, some pigments enhance heat and light stability of PP fibers stabilized with a particular AO or uv-absorber. Other pigments have the opposite effect. Until tested, one cannot predict with reasonable certainty, what the effect will be. For example, with a nickel-containing stabilizer, Red 101 (iron oxide) is a prodegradant. With the more effective HALS, both Yellow 93 and Red 144 are prodegradants. The effect of these pigments in stabilized PP fibers could not have been predicted by their behavior in unstabilized pigmented fibers, or by their behavior with a different stabilizer.

With a nickel-containing stabilizer, Red 144 (unlike Red 101) is a stabilizer (not a prodegradant), but Red 144 is a prodegradant with Tinuvin 770. Yellow 93, a stabilizer when no other stabilizer is present, is neutral with nickel stabilization but is a prodegradant with Tinuvin 770 (see "Stabilization of Polypropylene Fibers" by Marvin Wishman of Phillips Fibers Corporation). Specifically with respect to red PP fibers, the problem was to find a combination of stabilizers which circumvented the proclivity of Red 144 to degrade the PP fibers and plaques when the pigment is combined with a conventional AO and uv light stabilizer. Because Red 144 was a prodegradant, it seemed desirable to use only as much of it as would provide the desired tinctorial effect for the required period of time, namely the useful life of the stabilized fiber.

The effect of a large number of pigments on the stability of PP fibers stabilized with Tinuvin 770 has been reported by Steinlein and Saar (see "Influence of Pigments on the Degradation of Polypropylene Fibers on Exposure to Light and Weather", paper presented at the 19th International Manmade Fiber Conference, Sep. 1980 in Austria).

In the same vein, like other workers before me, I tested a large number of combinations of primary stabilizers with Red 144, both in PP fibers and in relatively thick (0.5 mm) PP film.

The chemical peculiarity about a PIP-T is that it contains at least one triazine ring, and all substitutable positions on each triazine ring are polysubstituted piperazin-2-ones. Chimassorb 944 is a HALS of comparable size to that of a PIP-T, and like PIP-T is a hybrid molecule containing a hindered amine (piperidine) and a triazine ring. Chimassorb 944 is an oligomer in which the repeating unit combines a hexamethylene diamine having polysubstituted piperidyl substituents on the N atoms, the substituted diamine unit being connected to a triazine ring in which one of the other substituents is a branched chain alkylamine, and the last substituent is also a hexamethylene diamine unit.

Mainly because Chimassorb 944 contains pendant piperidyl rings rather than piperazinone rings, but perhaps also because of the relatively elongated molecule, we found that Chimassorb 944, used in combination with a 3,5-DHBZ, is not as effective with azo pigmented PP as the combination of the 3,5-DHBZ with a PIP-T. The unexpected and particularly noteworthy boost of color-stability derived from a 3,5-DHBZ, is thought to be due to the electron-withdrawing effect of the para-position of the ester substituent, but the highly surprising effect when the ester group is aryl, for example, 2,4-di-t-butyl is thought to be attributable to the photo Fries rearrangement (when the 3,5-DHBZ is exposed to actinic radiation) which rearrangement can occur easily only with the aryl ester substituent. Other esters, particularly those derived from alicyclic or long chain aliphatic alcohols are comparably effective, though evidently not for the same reason.

Prior to the publication of some of the studies which set forth a framework within which the foregoing factors are to be considered, a manufacturer of the 3,5-DHBZ supplied a sales flyer in which its UV-Chek AM-340 stabilizer was stated to be "cost effective or synergistic with hindered amine light stabilizers, as well as, other stabilizer types, e.g., nickel organics, benzophenones, benzotriazoles, etc. in various polymers." The flyer further stated "In polymers, particularly polyolefins, UV-Chek AM-340 is a highly effective ultraviolet light stabilizer. It is especially effective in extruded and blown films, fine fibers, and molded articles. AM-340 is a white crystalline powder, and has no effect on the initial color of the polymer it is added to, and no effect on changing the shade of pigmented formulations. AM-340 is particularly useful in stabilizing pigmented polymers, especially in cases where the pigment itself contributes to the degradation of the polymer."

To the extent that such all-encompassing benefits of using AM-340 were not sales-oriented, they were based on data obtained with oriented PP film in 1×100 mil and 2×100 mil samples, and on 20 mil HDPE and 4 mil LLDPE plaques pigmented with 0.5% titanium dioxide. No observed color changes are provided, nor is there any indication that they were measured and found to show no change.

The PIP-T (see U.S. Pat. No. 4,480,092 to Lai and Son), which was discovered more than a decade after publication of the flyer, is acknowledged to be an excellent uv stabilizer and, because I found the combination of PIP-Ts with 3,5-DHBZ was effective with phthalocyanine-pigmented PO, I tested the same combination with the azo pigments.

SUMMARY OF THE INVENTION

It has been discovered that a combination of two primary stabilizers, provides an unexpectedly effective stabilization system for a polyolefin (PO) article which has been pigmented with an azo or disazo pigment (either or both referred to as "azo pigment"). One primary stabilizer is an oxo-piperazinyl triazine ("PIP-T") in which each substitutable position on each triazine ring is substituted with a polysubstituted piperazinone; and the other is a 3,5-di-substituted-4-hydroxybenzoate ("3,5-DHBZ").

It is therefore a general object of this invention to provide a stabilizer system for incorporation into an azo pigmented PO, which system affords an unexpectedly high boost in the stabilization effectiveness attributable to each primary stabilizer in the PO, and minimizes such color degradation of the PO as is typically the result of an interaction of stabilizers which lack unique compatibility relative to azo and disazo pigments. Such unique compatibility is exhibited in articles of PO stabilized with the system; the articles having improved strength and discoloration resistance compared to that of similar articles from identically pigmented PO but stabilized with several other commercially available hindered amines and hindered phenol, and tested by exposing the articles to infrared, visible and actinic radiation.

It has also been discovered that a stabilizer system consisting essentially of the combination of PIP-T and 3,5-DHBZ, in combination with only enough secondary stabilizer such as a hindered phenol and a phosphite, to provide melt stability during processing, is unexpectedly effective for stabilizing azo-pigmented PP articles. The stabilization is not only against thermoxidative and light degradation, but also against discoloration attributable to degradation of the pigment. Such degradation is particularly noticeable in PO articles exposed to bright sunlight for about 2 years at 45° South (exposure) in the Florida sun. If the PIP-T and the 3,5-DHBZ are each used in the range from about 0.1 phr to 2 phr (parts per hundred parts resin substrate), tinctorial strength of the pigment is maintained even when it is used in as small an amount as in the range from about 0.1 phr to about 1 phr in fibers, in which range there is little risk of the pigment "blooming".

It is therefore a general object of this invention to provide an azo-pigmented PP article which has been stabilized against exposure to sunlight, by incorporating into the PP an effective amount of a combination of PIP-T and 3,5-DHBZ primary stabilizers sufficient to stabilize the article so that, after being subjected to accelerated photooxidation with a high dose of UV light at 89° C. black panel temperature, and 50% relative humidity, the article exhibits essentially no fading of the color due to the pigment, and essentially no polymer degradation.

It is also a general object of this invention to provide a method for imparting improved strength and discoloration resistance to stabilized, azo-pigmented PO molded articles, extruded fibers and sheet, which method comprises incorporating into PO only as much of a conventional melt-stabilizing secondary stabilizer, no more than 0.1 phr, as is desired for melt stabilization of the fiber, and, an effective amount of each of two primary stabilizers, the PIP-T and the 3,5-DHBZ, each in an amount sufficient to stabilize the PO and decelerate discoloration of the pigmented PO, as evidenced by minimal color fading during the useful life of an article made with the pigmented PO.

It is a specific object of this invention to provide a method for stabilizing articles made from azo-pigmented woven and non-woven PE and PP fibers, which method comprises, subjecting the azo-pigmented fibers to an accelerated Xenon Arc Weather-O-Meter (GM test, SAE J1885) test until irradiation with 1240 Kjoules, estimated to provide comparable photooxidation to that which occurs during the useful life of the fiber within an automobile, with less than a ±3 units of color change (the minimum change visible to the naked eye) due to degradation of the pigment; the PE and PP fibers being essentially free of a color stabilizer and having incorporated therein (1) from 20 parts per million (ppm) to about 1 phr, preferably from 0.1 to 1 phr, of an azo pigment; (ii) from 20 ppm to about 2 phr, preferably from 0.1 phr to 1 phr of PIP-T; and, (iii) from 20 ppm to about 2 phr, preferably from 0.1 phr to 1.5 phr, of 3,5-DHBZ, based upon the weight of the PO in the fibers or sheet.

BRIEF DESCRIPTION OF THE DRAWING

The foregoing and other objects and advantages of my invention will appear more fully from the following description, made in connection with the accompanying graphs which illustrate the result-effectiveness of the combination of PIP-T and 3,5-DHBZ in PP fibers pigmented with various azo pigments, but essentially free of a secondary stabilizer, that is, having no more than 0.1 phr of each, a melt-stabilizing AO such as a conventional hindered phenol, and a phosphite.

Figure 1:
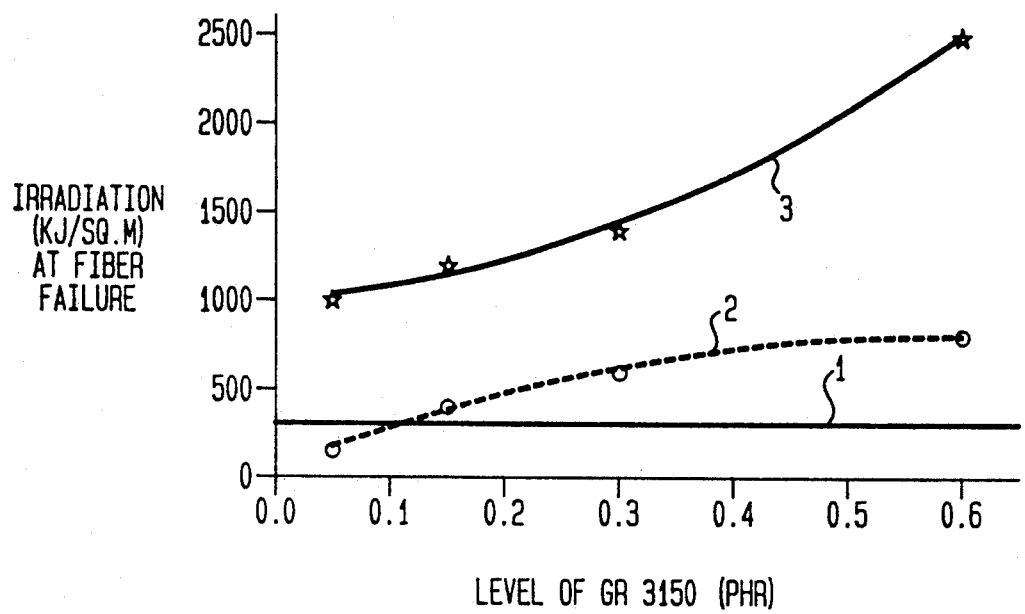
FIG. 1 is a plot of three curves identified by numerals 1, 2 and 3 showing the amount of irradiation fibers pigmented with 0.75 phr Blue 15 pigment can tolerate before they fail as a function of the amount of primary stabilizer, 3,5-DHBZ (UV-Chek AM-340) or PIP-T (triazine tri-substituted with PSP) in the fiber; curve 1 is for pigmented fibers stabilized with 0.6 phr of UV-Chek AM-340 alone; curve 2 is for different levels of PIP-T; curve 3 is for pigment fibers stabilized with 0.6 phr of UV-Chek AM-340 in combination with the aforementioned PIP-T at different levels.

All fiber in the samples was made from PP containing the designated HALS and 3,5-DHBZ as primary stabilizers, the pigment, and, 0.1 phr Irganox$^R$ 3114 (a hindered phenol melt-stabilizer) and 0.08 phr Weston 626 (a phosphite melt-stabilizer), as secondary, "process" stabilizers.

DETAILED DESCRIPTION OF PREFERRED EMBODIMENTS

This invention is particularly directed to stabilization of azo-pigmented PO molded articles for household goods such as laundry baskets and waste paper baskets, and for azo-pigmented PP fibers used in fabrics for automobile seats, dashboards, and rear decks, and for clothing and drapes, all of which may be exposed to sunlight, and typically are. The temperature inside a modern car with much glass (to reduce weight) and windows up, can reach 90° C. (hence the GM test with a black panel temperature of 89° C.). Hence the commercial need for stabilized pigmented PP and PE articles (see "Growing Trends in Automotive Textiles" by G. Robert Turner *Textile Chemist and Colorist* 17–18 Vol 20, No. 6, 988; "New Phillips Fiber for Automotive Market Stands Up to UV Rays". N/W Staff Report *Nonwovens World* pg 45–46, January 1989; "The Degradation of Automotive Upholstery Fabrics by Light and Heat" by Brian Milligan, pg 1–7 *Rev. Prog. Coloration* Vol 16, 1986).

In a particular embodiment, this invention provides an article made from a woven or non-woven fabric of azo-pigmented PP fibers. Woven fabrics are produced from yarn by any one of several weaving techniques. Non-woven fabric of PP may have a carded fiber structure or comprise a mat in which the fibers or filaments are distributed in random array. The fibers may be bonded with a bonding agent such as a polymer, or the fibers may be thermally bonded without a bonding agent. The fabric may be formed by any one of numerous known processes including hydroentanglement or spun-lace techniques, or by air laying or melt-blowing filaments, batt drawing, stitchbonding, etc. depending upon the end use of the article to be made from the fabric.

Incorporated in the PP, and preferably uniformly distributed in the PP melt before it is spun into filaments, is (i) a small amount, about 1 phr (based on the weight of all the polymer from which the article is formed), of azo pigment, and typically from 0.05 phr to about 0.75 phr; (ii) no more than 0.1 phr each of secondary stabilizer, namely a hindered phenol and a phosphite, required for melt-stabilization of the PP; (iii) from about 0.1 phr to about 1.0 phr, of PIP-T; and (iv) from about 20 ppm to about 2 phr, and preferably from about 0.1 phr to about 1 phr, of a 3,5-DHBZ.

The preparation of a PIP-T is disclosed in detail in the foregoing Lai et al '092 patent. The PIP-T is an oxo-piperazinyl triazine having a structure selected from

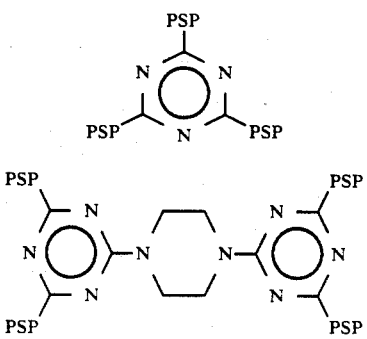

wherein PSP is a substituent having a formula selected from the following

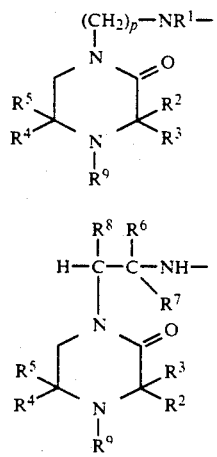

wherein, $R^1$ represents $C_1-C_{24}$ alkyl, $C_5-C_{20}$ cycloalkyl, $C_7-C_{20}$ araalkyl or alkaryl, $C_1-C_{24}$ aminoalkyl, or $C_6-C_{20}$ aminocycloalkyl;

$R^2$, $R^3$, $R^4$, and $R^5$ independently represent $C_1-C_{24}$ alkyl; and, $R^2$ with $R^3$, or $R^4$ with $R^5$ are cyclizable to $C_5-C_{12}$ cycloalkyl including the $C^3$ and $C^5$ atoms respectively, of the piperazin-2-one ring;

$R^6$ and $R^7$ independently represent $C_1-C_{24}$ alkyl, and polymethylene having from 4 to 7 carbon atoms which are cyclizable;

$R^8$ represents H, $C_1-C_6$ alkyl, and phenyl;

$R^9$ represents H and $C^1-C^3$ alkyl; and, p represents an integer in the range from 2 to about 10.

Alkyl is preferably $C_1-C_5$ for example, methyl, ethyl, isopropyl, sec-butyl, and n-amyl, most preferably methyl.

Alkenyl is preferably $C_2-C_4$ for example, vinyl, allyl, and butenyl, most preferably allyl.

Cycloalkyl is preferably $C_5-C_7$ for example, cyclopentyl, cyclohexyl, and cycloheptyl, most preferably cyclohexyl.

Alkoxy is preferably $C_1-C_5$ for example, methoxy, ethoxy, isopropoxy, butoxy, and pentoxy, most preferably methoxy.

Aralkyl is preferably $C_7-C_{12}$ for example, benzyl, p-methylbenzyl, and 4-butylbenzyl, most preferably benzyl.

Aminoalkyl is preferably $C_1-C_6$ for example, methylamino, ethylamino, isopropylamino, butylamino, and pentylamino, most preferably hexylamino.

Cycloaminoalkyl is preferably $C_6-C_8$ for example, cyclohexylamino, cycloheptylamino, cyclooctylamino, most preferably cyclohexylamino.

Illustrative examples of PSPs are represented by the following structures:

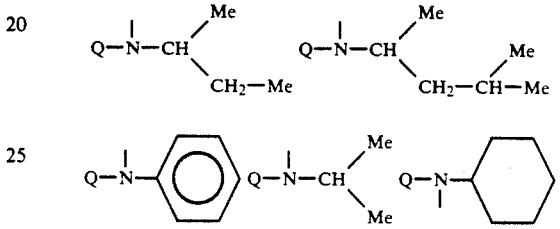

where Q represents

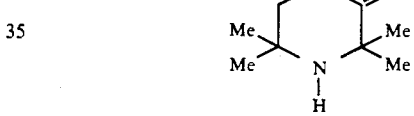

wherein Me=methyl, and the bond on the N atom indicates connection to the triazine ring.

Specific tri-substituted PIP-Ts having the following polysubstituted piperazin-2-one substituents are:

1-[3-(isopropylamino)propyl]-3,3,5,5-tetramethylpiperazin-2-one;
1-[2-(isopropylamino)ethyl]-3,3,5,5-tetramethylpiperazin-2-one;
1-[2-(butylamino)ethyl]-3,3,5,5-tetramethylpiperazin-2-one; and,
1-[2-(cyclohexylamino)ethyl]-3,3,5,5-tetramethylpiperazin-2-one; inter alia.

Specific alkylated PIP-Ts which are tri-substituted with polysubstituted piperazin-2-one substituents are prepared by alkylating the foregoing PIP-Ts so as to alkylate the $N^4$ atom of the piperazinone ring. Each PSP substituent is attached through the terminal N atom to the triazine ring, the substituent being selected from 1-[3-(isopropylamino)propyl]-3,3,4,5,5-pentamethylpiperazin-2-one;
1-[2-(isopropylamino)ethyl]-3,3,4,5,5-pentamethylpiperazin-2-one;
1-[2-(butylamino)ethyl]-3,3,4,5,5-pentamethylpiperazin-2-one; and,
1-[2-(cycohexylamino)ethyl]-3,3,4,5,5-pentamethylpiperazin-2-one; inter alia.

It is this limited class of triazines, and particularly those monomolecular ones having a relatively low MW in the range from about 850 to less than 2000, which in combination with the 3,5-DHBZ display the remarkable stabilization activity of azo pigmented PO in the presence of such a low concentration of phosphorous acid or fluorophosphorous acid ester.

The preparation of a 3,5-DHBZ ester is conventional and numerous such esters have been disclosed for use as stabilizers. Typically a 4-hyroxybenzoic acid with desired substituents at the 3- and 5- positions is prepared and reacted with a phenol having desired substituents at the 2- and 4-positions.

The 3,5-DHBZ is a 3,5-disubstituted-4-hydroxybenzoate structurally represented as:

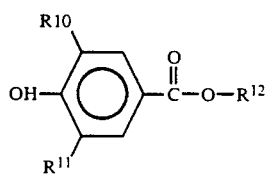

wherein
$R^{10}$ and $R^{11}$ each represent $C_1$-$C_{12}$ alkyl, phenyl, naphthyl, $C_4$-$C_{12}$ cycloalkyl, and $C_1$-$C_8$ alkyl-substituted cycloalkyl, each alkyl substituent being $C_1$-$C_8$; and, $R^{12}$ represents a hydrocarbyl group selected from $C_{10}$-$C_{24}$ alkyl, $C_4$-$C_{12}$ cycloalkyl, $C_1$-$C_8$ alkyl-substituted cycloalkyl, and, 2,4-disubstituted phenyl wherein the substituents independently represent $C_1$-$C_{24}$ alkyl, $C_4$-$C_8$ cycloalkyl, and $C_1$-$C_8$ alkyl-substituted cycloalkyl.

Illustrative examples of 3,5-DHBZ stabilizers are:

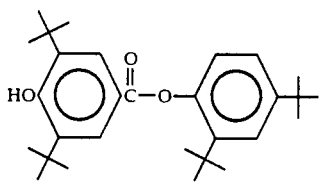

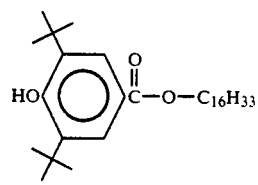

+ = t-butyl

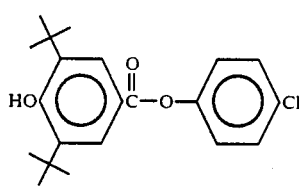

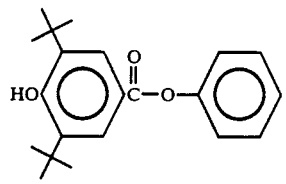

The method for imparting improved discoloration resistance to a shaped article of a polyolefin comprises, incorporating into a melt from which the shaped article is formed, an effective amount, sufficient to color the article but less than 2 phr, of an azo pigment so as to produce an azo-pigmented article, and an effective amount, sufficient to attenuate degradation of the azo-pigmented article when exposed to sunlight for several months, of two primary stabilizers.

The polyolefin is typically polypropylene homopolymer, or copolymers of propylene with a minor amount of ethylene, or, polyethylene homopolymer, or copolymers of ethylene with a minor amount of propylene. If desired, to facilitate melt-processing of the PO, particularly if the PO is to be subjected to multiple thermoforming operations at a temperature above 200° C., a melt-stabilizing quantity of a secondary stabilizer may also be used, the amount being no more than is necessary to provide melt-stabilization, namely 0.1 phr. The preferred azo-pigmented, 3,5-DHBZ-stabilized, PO has so small an amount of AO added to it that the AO does not make a sufficiently noticeable adverse contribution towards negative interaction upon exposure to sunlight, and is tolerable. Such a small amount of AO may be present in commercially available AO-free PP fibers, added thereto for process stability to facilitate manufacture of the fibers. Additives other than an AO may be added if it is known they do not adversely affect the desired color, or help degrade the physical properties of the PP fibers when exposed to sunlight. Such additives may include lubricants in addition to alkaline earth metal stearates, near-colorless or white fillers such as glass fibers or talc, and optical brighteners.

Preferred hindered phenol secondary stabilizers are 1,3,5-tris-(3',5'-di-t-butyl-4-hydroxybenzyl)-isocyanurate;
1,3,5-tris-(3',5'-di-t-butyl-4-hydroxybenzyl)-2,4,6-trimethylbenzene;
ethyleneglycol-bis(3,3-bis-3'-t-butyl-4'-hydroxyphenyl)-butyrate;
pentaerythrit-tetra-[3-(3,5-di-t-butyl-4-hydroxyphenyl)-propionate];
octadecyl-tetra-[3-(3,5-di-t-butyl-4-hydroxyphenyl)propionate];
bisethyleneglycol-bis(3,3-bis-3'-t-butyl-4'-hydroxyphenyl)propionate];
hexamethylene-1,6-di-[3-(3,5-di-t-butyl-4-hydroxyphenyl)propionate]; and the like.

Preferred phosphite secondary stabilizers are
(a) the symmetrical pentaerythritol phosphites represented by the structure

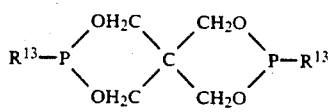

wherein $R^{13}$ is derived from a $C_{12}$–$C_{24}$ monohydric alcohol preferably $C_{18}$ such as in Weston 618, or a di-$C_1$–$C_{12}$ alkyl-substituted phenol, preferably 2,4-di-t-butylphenol such as in Ultranox; and, (b) symmetrical triaryl phosphites represented by the structure

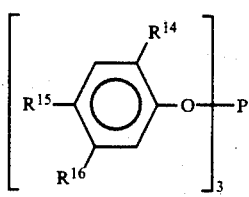

wherein $R^{14}$ represents t-butyl, 1,1-dimethylpropyl, cyclohexyl, or phenyl, and one of $R^{15}$ and $R^{16}$ is hydrogen and the other is hydrogen, methyl, t-butyl, 1,1-dimethylpropyl, cyclohexyl or phenyl.

If desired, secondary stabilizers other than a phosphite or hindered phenol may be used, and may be desirable with other pigment colors, but each secondary stabilizer is always used in an amount no more than 0.1 phr, sufficient to provide adequate melt-stabilization but insufficient to accelerate discoloration with the azo-pigment used. Additional amounts of secondary stabilizers may be used, but with additional risk of causing side reactions, and with no economic justification for doing so. No conventional color stabilizer, other than such color stabilizing effects as may be attributable to such trace amounts of secondary stabilizers, if these are used, is either desirable or necessary.

Typically PP is polypropylene homopolymer, but may be a random or block copolymer of propylene and a monolefinically unsaturated monomer X, (P-co-X) with up to about 30% by wt of X wherein X represents a minor amount of monoolefinically unsaturated monomer such as vinyl acetate, or a lower $C_1$–$C_4$ alkyl acrylate or methacrylate Blends of such propylene polymers with other polymers such as polyethylene are also included within the scope of this invention. In an analogous manner, pE is typically polyethylene homopolymer, but may be E-co-X. For convenience, homopolymer PE or PP and copolymers E-co-X or P-co-X are together referred to herein as polyolefin PO, no distinction being made with respect to is as a substrate, compared to homopolymers and copolymers of ethylene and propylene. When azo-pigmented PO is to be stabilized, it preferably has a number average molecular weight Mn in the range from about 10,000 to about 500,000, preferably about 30,000 to about 300,000 with a melt flow index from 0.1 to 100 g/10 min when measured according to ASTM D-1238.

Solely for the purpose of facilitating processing of the PO melt, particularly for melt extrusion of the PO, a metal stearate such as calcium or zinc stearate in an amount insufficient to deleteriously affect the color of the fibers, preferably in the range from about 100 ppm to about 1500 ppm, is added.

Since a predominant concern is the desired color contributed by the azo pigment, only enough of the pigment is added to the normally water white PO to produce the color, but no more than 2 phr. The optimum of azo pigment for individual articles will depend upon the type of article, whether fibers, sheet or injection molded, for example, and the conditions under which the article is expected to be used. Further, the optimum amount will depend upon the particular azo pigment to be used, and the change in color which will be acceptable over a specified period of time.

The PIP-T and 3,5-DHBZ stabilizers and the azo pigment, may readily be incorporated into the PO by any conventional technique at a convenient stage prior to thermoforming the PO. For example, in the melt-extrusion of PP to form fibers, the pigment and stabilizer may be mixed with the PP in dry powder form, or a suspension or emulsion of the stabilizer may be mixed with a solution, suspension, or emulsion of the polymer.

Articles made of azo-pigmented, stabilized PO, and particularly household goods and clothing made from PO fibers, once placed in service, are likely to be used for several years and are not likely to be exposed continuously to several years of bright sunlight at 45° South (exposure). When noticeable fading of the pigment does eventually occur, the article has provided so large a proportion of its useful life that its color degradation is not objectionable.

In the comparative tests made and recorded in the following experiments, color change is measured according to the Standard Method for Calculation of Color Differences from Instrumentally Measure Color Coordinates, ASTM D 2244-85. The change in color measured in this manner does not reflect the peach-skin appearance due to broken fibers of degraded yarn. The useful life of the fabric is terminated when its surface becomes fuzzy as a peaches'. Visual inspection under an optical microscope shows that individual fibers in the matrix of the yarn are broken.

Polymer degradation is measured qualitatively by placing a sample of fabric under a low power optical microscope and scraping the surface of the yarn with a blunt spatula. When the fibers are readily broken wile the yarn is being scraped, the fabric has been degraded even if the color change is acceptably low.

The Weather-O-Meter tests are conducted as described in Summary of Test Conditions for SAE J1885 using a Xenon Arc Weather-O-Meter with controlled irradiance and water cooled lamp as follows;

|  | Light | Dark |
| --- | --- | --- |
| Irradiance watts/m² @ 340 nm | 0.55 | — |
| Black Panel Temp., °C. | 89 | 38 |
| Relative Humidity, % | 50 | 95 |
| Cycle Time, hr | 3.8 | 1.0 |

EXAMPLES WITH PIGMENTED THICK FILM AND MONOFILAMENT FIBERS

All samples are made from Profax 6301 PP having a nominal melt flow index of about 14. Films are prepared by dry blending the stabilizers and pigment, and extruding at 230° C. to form a rod about 0.5 cm in diameter, and the rod is comminuted to form pellets. The pellets are compression molded at 210° C. to form a 5 mil thick film.

Stabilized monofilaments are prepared from pellets made from rod which has been extruded twice at 230° C. The twice-extruded pellets are then extruded at 260°

C. through a 40-hole spinneret to give about a 15 denier monofilament which is oriented 3:1. A bundle of oriented monofilaments is knitted into a fabric a piece of which is then used as a test sample.

All samples were tested under the conditions for SAE J1885 set forth hereinabove. The data is presented in the curves of the appended Figures.

All fiber samples containing only UV-Chek AM-340 failed at less than 450 Kjoules/m² irrespective of the level of stabilizer up to 0.6 phr. Accurate measurements for the time of failure were not made because 450 Kjoules/m² represents the minimum period for which stability is required, equivalent to about 5 years of normal outdoor use of an automobile.

All fiber samples containing only the secondary stabilizers Irganox 3114 (0.1 phr), and Weston 626 (0.08) fail at about 150 Kjoules/m²; and all fiber samples containing only pigment at 0.75 phr level, irrespective of the pigment used, fail at about 150 Kjoules/m². Accurate measurements for the time of failure were not made because 150 Kjoules/m² represents too short a period relative to that for which stability is required.

Referring to FIG. 1, it is seen that pigmented fibers (0.75 phr Blue 15) with the UV-Chek AM-340 alone, at 0.6 phr, fail at about 300 KJ/m² curve 1); fibers with PIP-T at 0.6 phr fail at about 700 KJ/m² (curve 2); but combined, the PIP-T and the UV-Chek AM-340, each at 0.6 phr, fail at 2500 KJ/m² (curve 3).

Figure 2:
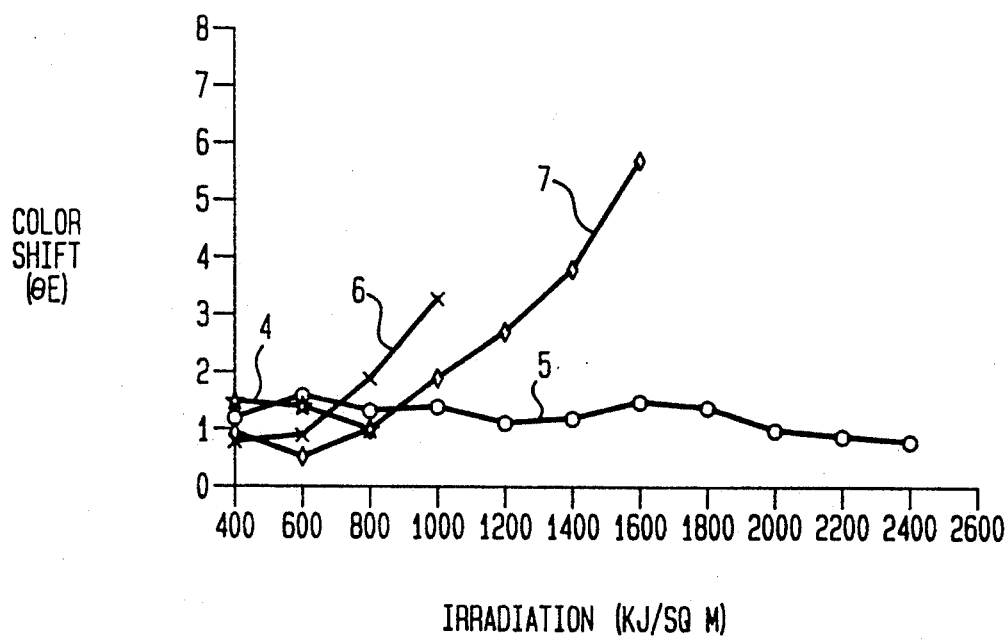
FIG. 2 is a plot of four curves identified by numerals 4, 5, 6 and 7 which present data on the change in color (▲ E) due to degradation of blue and yellow pigments in fabric made of Blue 15 phthalocyanine and Yellow 93 azo-pigmented PP fibers, the data being set forth as a function of the amount of energy absorbed over a period of time (measured in a Weather-O-Meter) until failure of the fibers, and showing how much irradiation each sample can tolerate before visible color change exceeds an unacceptably high (>3 units) level.

Referring to FIG. 2, it is seen that PIP-T stabilized fibers with Blue 15 at 0.6 phr, and no UV-Chek AM-340 fail at about 800 KJ/m² (curve 4) though there is no visible color change; fibers with Blue 15, combined with PIP-T and UV-Chek AM-340, each at 0.6 phr, fail at about 2400 KJ/m² (curve 5), and again, there is no visible change in color even when failure occurs. Fibers with Yellow 93 and PIP-T at 0.6 phr, exceed a color shift of 3 before reaching 800 KJ/m² when there is no UV-Chek AM-340 (curve 6); when UV-Chek AM-340 is added to the Yellow 93 and combined with PIP-T, the color shift does not exceed 3 units until 1250 KJ/m² (curve 7), indicating about 25% improvement over fibers with no UV-Chek AM-340.

Figure 3:
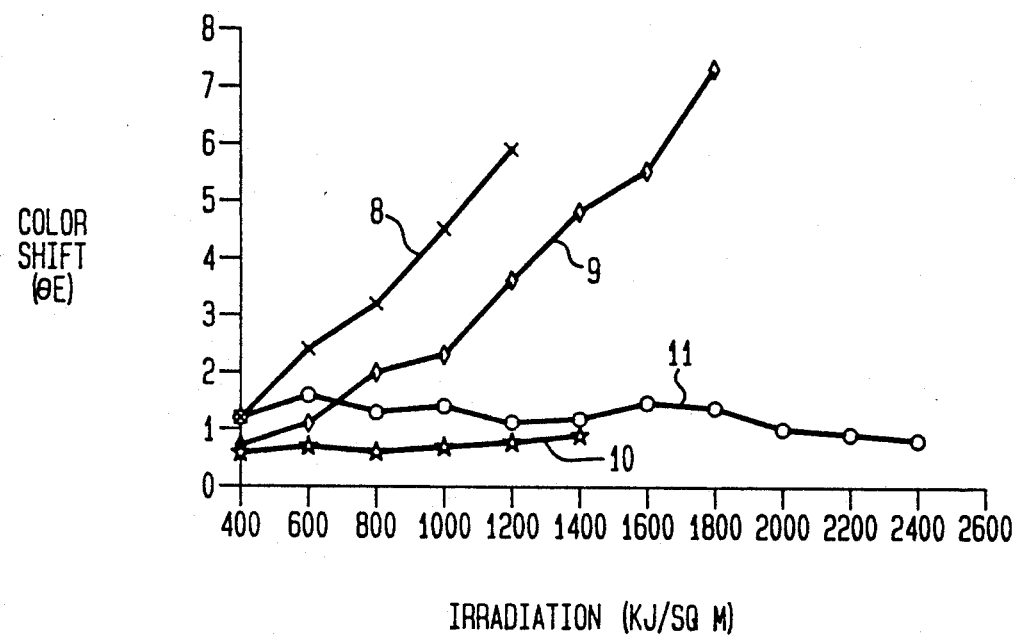
FIG. 3 is a plot of four curves identified by numerals 8, 9, 10 and 11 which present data on the change in color (▲ E) due to degradation of orange and red pigments in fabric made of Orange 34 and Red 144 azo-pigmented PP fibers, the data being set forth as described for FIG. 2.

Referring to FIG. 3, it is seen that PIP-T stabilized fibers with Orange 34 at 0.6 phr, exceed a color shift of 3 units before reaching 800 KJ/m² when there is no UV-Chek AM-340 (curve 8); when UV-Chek AM-340 is added to the Orange 34 and combined with PIP-T, each at 0.6 phr the color shift does not exceed 3 units until about 1100 KJ/m² (curve 9), indicating about 33% improvement over fibers with no UV-Chek AM-340.

Fibers with Red 144 at 0.6 phr, and no UV-Chek AM-340 fail at about 1400 KJ/m² (curve 10) though there is no visible color change; fibers with Red 144, and PIP-T each combined with PIP-T and UV-Chek AM-340, each at 0.6 phr, fail at about 2400 KJ/m² (curve 11), and again, and there is still no visible shift in color even when failure occurs.

Figure 4:
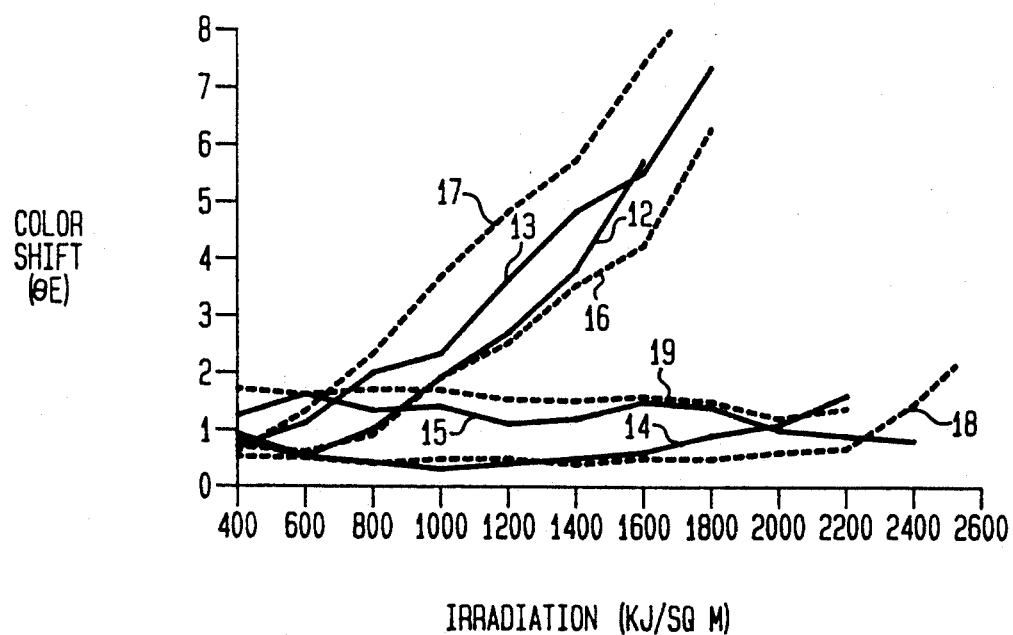
FIG. 4 is a plot of two sets of curves for each of four pigments used in combination with UV-Chek AM-340, each at 0.6 phr, one set being for the aforementioned PIP-T, and the other set being for the PIP-T after it is methylated at the $N^4$ position of each piperazinone ring. The curves for the PIP-T are identified by numerals 12, 13, 14 and 15; the curves for the methylated PIP-T are identified by numerals 16, 17, 18 and 19; the curves present data on the change in color (▲ E) due to degradation of the yellow, orange, red and blue pigments respectively, used in the samples for which test results are shown in the foregoing Figures.

Referring to FIG. 4 there is ,shown a set of curves 12-15 for each of four pigments Yellow 93, Orange 34, Red 144 and Blue 15 respectively, used in combination with unmethylated PIP-T and UV-Chek AM-340, each at 0.6 phr. Though the yellow and orange fibers display a color shift which exceeds 3 units after exposure to irradiation in the range from about 900 to 1300 KJ/m², it is clear that they allow use of an article made with such fibers for use outdoors in an automobile (say) over a period of at least about 10 years. Clearly the Red 144 and Blue 15 pigmented fibers have much longer useful lives, and never exceed a color shift of 3 units during use. The foregoing is also true for fibers pigmented with the same pigments in identical amounts as seen in curves 16, 17, 18 and 19 for methylated PIP-T.

Figure 5:
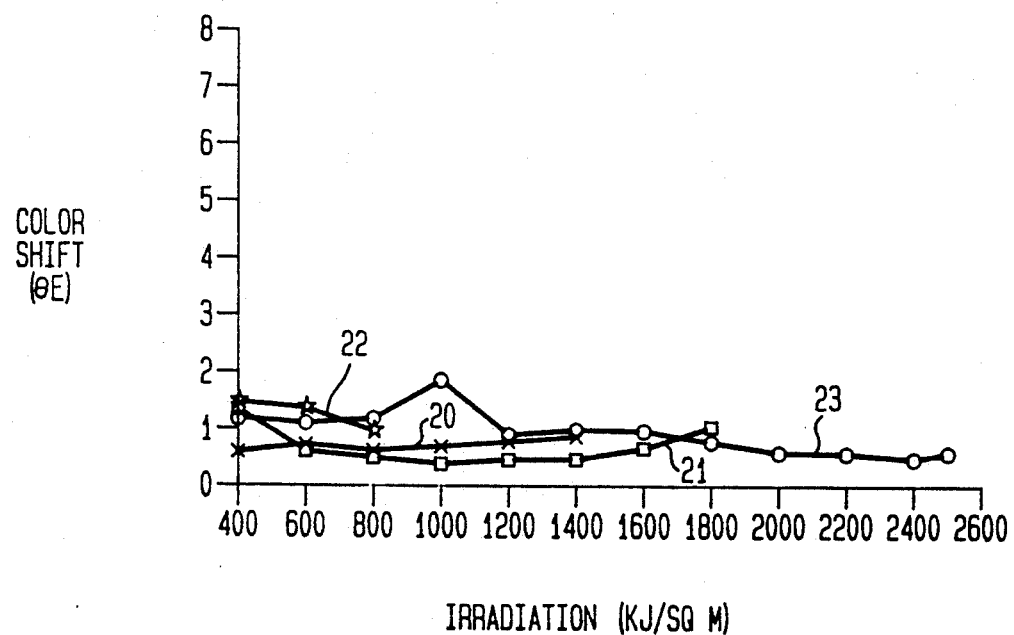
FIG. 5 is a plot of four curves identified by numerals 20, 21, 22 and 23 which present data on the change in color (▲ E) due to degradation of red and blue pigments in fabric made of Red 144 and Blue 15-pigmented PP fibers, and combining PIP-T with another 3,5-DHBZ, namely Cyasorb 2908. The data is set forth as described for FIG. 2.

Referring to FIG. 5 there is shown a set of curves 20-21 for Red 144 at 0.75 phr without and with 0.6 phr UV2908 (II), respectively, and curves 22-23 for Blue 15 without and with 0.6 phr (II), respectively, used in combination with unmethylated PIP-T also at 0.6 phr.

We claim:

1. A method for imparting improved discoloration resistance to a shaped article of a polyolefin, comprising, incorporating into a melt from which said shaped article is formed, an effective amount, sufficient to color the article but less than 2 phr, of an azo or disazo pigment, and, a combination of two primary stabilizers substantially free of secondary stabilizers, so as to produce an 'azo-pigmented article for outdoor use, said combination including (a) a substantially oxo-piperazinyl triazine (PIP-T) having a structure selected from the group consisting of

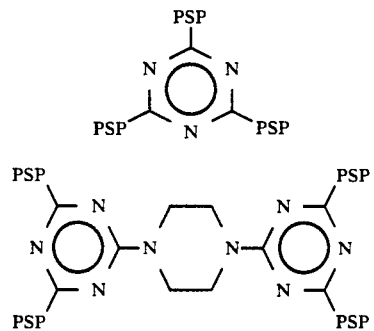

wherein PSP is a substituent having a formula selected from the following

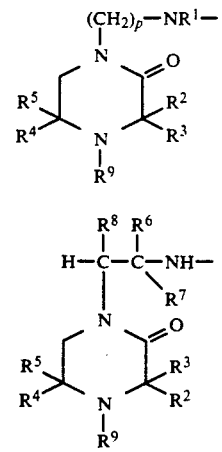

wherein, $R^1$ represents $C_1$-$C_{24}$ alkyl, $C_5$-$C_{20}$ cycloalkyl, $C_7$-$C_{20}$ araalkyl or alkaryl, $C_1$-$C_{24}$ aminoalkyl, or $C_6$-$C_{20}$ aminocycloalkyl;

$R^2$, $R^3$, $R^4$, and $R^5$ independently represent $C_1$-$C_{24}$ alkyl; and, $R^2$ with $R^3$, or $R^4$ with $R^5$ are cyclizable to $C_5$-$C_{12}$ cycloalkyl including the $C^3$ and $C^5$ atoms respectively, of the piperazin-2-one ring;

$R^6$ and $R^7$ independently represent $C_1-C_{24}$ alkyl, and polymethylene having from 4 to 7 carbon atoms which are cyclizable;

$R^8$ represents H, $C_1-C_6$ alkyl, and phenyl;

$R^9$ represents H and $C_1-C_3$ alkyl; and, p represents an integer in the range from 2 to about 10;

(b) a 3,5-di-substituted-4-hydroxybenzoate having the structure

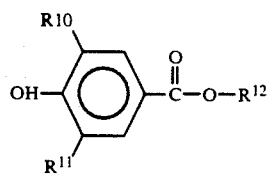

wherein $R^{10}$ and $R^{11}$ each represent $C_1-C_{12}$ alkyl, phenyl, naphthyl, $C_4-C_{12}$ cycloalkyl, and $C_1-C_8$ alkyl-substituted cycloalkyl, each alkyl substituent being $C_1-C_8$; and, $R^{12}$ represents a hydrocarbyl group selected from $C_{10}-C_{24}$ alkyl, $C_4-C_{12}$ cycloalkyl, $C_1-C_8$ alkyl-substituted cycloalkyl, and, 2,4-disubstituted phenyl wherein the substituents independently represent $C_1-C_{24}$ alkyl, $C_4-C_8$ cycloalkyl, and $C_1-C_8$ alkyl-substituted cycloalkyl.

2. The method of claim 1 wherein said polyolefin is selected from the group consisting of a homopolymer of ethylene, a copolymer of ethylene with a minor amount by weight of propylene, a random or block copolymer (E-co-X) wherein E represents ethylene and X represents a minor amount by weight of a monoolefinically unsaturated monomer, a homopolymer of propylene, a copolymer of propylene with a minor amount of ethylene, and a random or block copolymer (P-co-X) wherein P represents propylene.

3. The method of claim 2 comprising exposing said azo-pigmented polyolefin in a Xenon Arc Weather-O-Meter SAE J1885 test for a period sufficient to absorb 1240 Kjoules, and resulting in less color change than +3; and, said PIP-T is specified by, $R^1$ being $C_3-C_{12}$ alkyl, and $C_6-C_7$ cycloalkyl;

$R^2$ and $R^3$ are each $C_1-C_3$ alkyl and together, when cyclized, represent cyclohexyl, methylcyclohexyl, or cycloheptyl;

$R^4$ with $R^5$, are each $C_1-C_3$ alkyl and together, when cyclized, represent cyclohexyl, methylcyclohexyl, or cycloheptyl; and, $R^9$ is hydrogen or methyl.

4. The method of claim 3 wherein said PSP is represented by a structure selected from the group consisting of:

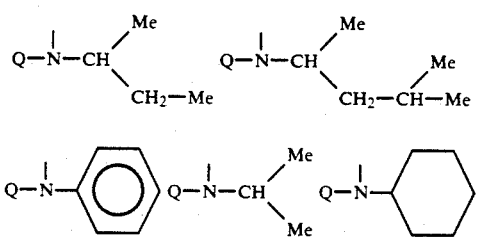

where Q represents

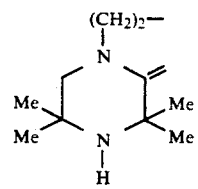

wherein Me=methyl, and the bond on the N atom indicates connection to the triazine ring.

5. The method of claim 3 wherein said 3,5-DHBZ is represented by a structure selected from

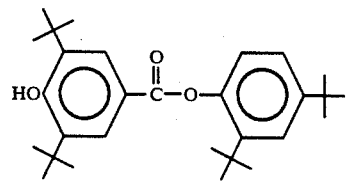

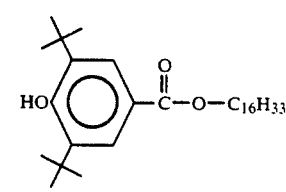

$+$ = t-butyl

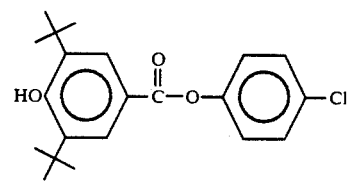

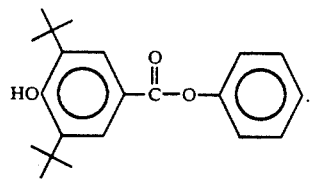

6. The method of claim 5 wherein said azo pigment is selected from the group consisting of Red 144, Orange 34 and Yellow 93, and combinations thereof.

7. The method of claim 6 wherein said azo pigment is present in an amount in the range from 20 ppm to about 1 phr; said PIP-T is present in an amount in the range from 20 ppm to about 2 phr; said 3,5-DHBZ is present in an amount in the range from 20 phr to about 2 phr; based on the weight of said polyolefin.

8. The method of claim 3 wherein said article is formed by melt-extruding said polyolefin, and said melt includes a secondary strabilizer present in no more than a melt-stabilizing amount, no more than 0.1 phr.

9. The method of claim 7 wherein said article is formed by melt-extruding said polyolefin, and said melt includes a secondary stabilizer present in no more than a melt-stabilizing amount of 0.1 phr.

10. The method of claim 9 wherein said polyolefin is selected from polypropylene homopolymer and a copolymer of propylene with a minor amount of ethylene; and, said secondary stabilizer is selected from a hindered phenol and a phosphite.

11. An article of manufacture of improved discoloration resistance, formed from a polyolefin containing an effective amount, sufficient to color the article but less than 2 phr, of an azo or disazo pigment, and, a combination of two primary stabilizers substantially free of secondary stabilizers, so as to produce an azo-pigmented article for outdoor use, said primary stabilizers consisting essentially of (a) a substantially oxo-piperazinyl triazine (PIP-T) having a structure selected from the group consisting of

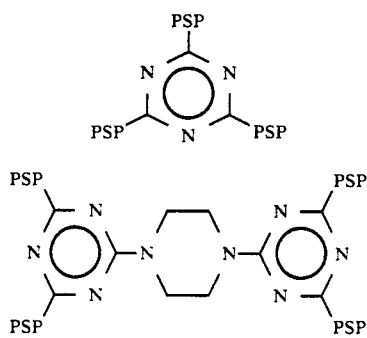

wherein PSP is a substituent having a formula selected from the following

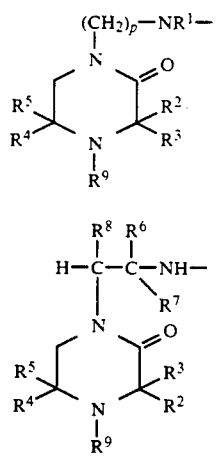

wherein, $R^1$ represents $C_1$-$C_{24}$ alkyl, $C_5$-$C_{20}$ cycloalkyl, $C_7$-$C_{20}$ araalkyl or alkaryl, $C_1$-$C_{24}$ aminoalkyl, or $C_6$-$C_{20}$ aminocycloalkyl;

$R^2$, $R^3$, $R^4$, and $R^5$ independently represent $C_1$-$C_{24}$ alkyl; and, $R^2$ with $R^3$, or $R^4$ with $R^5$ are cyclizable to $C_5$-$C_{12}$ cycloalkyl including the $C^3$ and $C^5$ atoms respectively, of the piperazin-2-one ring;

$R^6$ and $R^7$ independently represent $C_1$-$C_{24}$ alkyl, and polymethylene having from 4 to 7 carbon atoms which are cyclizable;

$R^8$ represents H, $C_1$-$C_6$ alkyl, and phenyl;

$R^9$ represents H and $C_1$-$C_3$ alkyl; and, p represents an integer in the range from 2 to about 10;

(b) a 3,5-di-substituted-4-hydroxybenzoate having the structure

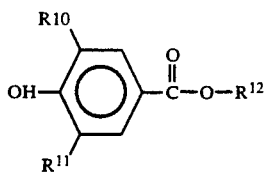

wherein $R^{10}$ and $R^{11}$ each represent $C_1$-$C_{12}$ alkyl, phenyl, naphthyl, $C_4$-$C_{12}$ cycloalkyl, and $C_1$-$C_8$ alkyl-substituted cycloalkyl, each alkyl substituent being $C_1$-$C_8$; and, $R^{12}$ represents a hydrocarbyl group selected from $C_{10}$-$C_{24}$ alkyl, $C_4$-$C_{12}$ cycloalkyl, $C_1$-$C_8$ alkyl-substituted cycloalkyl, and, 2,4-disubstituted phenyl wherein the substituents independently represent $C_1$-$C_{24}$ alkyl, $C_4$-$C_8$ cycloalkyl, and $C_1$-$C_8$ alkyl-substituted cycloalkyl.

12. The article of claim 11 wherein said polyolefin is selected from the group consisting of a homopolymer of ethylene, a copolymer of ethylene with a minor amount by weight of propylene, a random or block copolymer (E-co-X) wherein E represents ethylene and X represents a minor amount by weight of a monoolefinically unsaturated monomer, a homopolymer of propylene, a copolymer of propylene with a minor amount of ethylene, and a random or block copolymer (P-co-X) wherein P represents propylene.

13. The article of claim 12 wherein said azo-pigmented polyolefin has been exposed in a Xenon Arc Weather-O-Meter SAE J1885 test for a period sufficient to absorb 1240 Kjoules, and resulting in less color change than ±3; and, said PIP-T is specified by, $R^1$ being $C_3$-$C_{12}$ alkyl, and $C_6$-$C_7$ cycloalkyl;

$R^2$ and $R^3$ are each $C_1$-$C_3$ alkyl and together, when cyclized, represent cyclohexyl, methylcyclohexyl, or cycloheptyl;

$R^4$ and $R^5$, are each $C_1$-$C_3$ alkyl and together, when cyclized, represent cyclohexyl, methylcyclohexyl, or cycloheptyl; and, $R^9$ is hydrogen or methyl.

14. The article of claim 13 wherein said PSP is represented by a structure selected from the group consisting of:

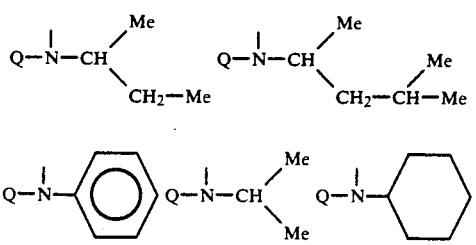

where Q represents

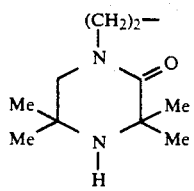

wherein Me=methyl, and the bond on the N atom indicates connection to the triazine ring.

15. The article or claim 13 wherein said 3,5-DHBZ is represented by a structure selected from

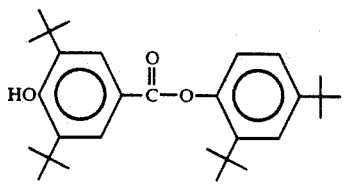

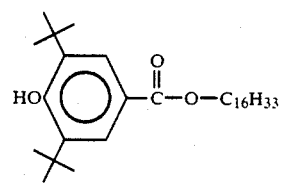

+ = t-butyl

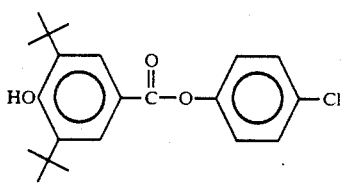

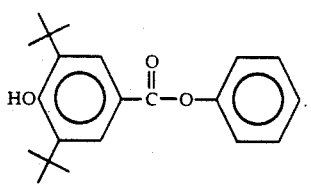

16. The article of claim 14 wherein said azo pigment includes a disazo pigment is selected from the group consisting of Red 144, Orange 34 and Yellow 93, and combinations thereof.

17. The article of claim 15 wherein said azo pigment is present in an amount in the range from 20 ppm to about 1 phr: said PIP-T is present in an amount in the range from 20 ppm to about 2 phr; and, said 3,5-DHBZ is present in an amount in the range from 20 phr to about 2 phr; based on the weight of said polyolefin.

18. The article of claim 17 wherein said article is formed by melt-extruding said polyolefin, and said melt includes a secondary stabilizer present in no more than a melt-stabilizing amount, no more than 0.1 phr.

19. The article of claim 18 wherein said polyolefin is selected from polypropylene homopolymer and a copolymer of propylene with a minor amount of ethylene; and, said secondary stabilizer is selected from a hindered phenol and a phosphite.

20. A multi-component stabilizer system for stabilizing pigmented polyolefin against discoloration, thermooxidative degradation, and degradation due to ultraviolet light, consisting essentially of (a) no more than a melt-stabilizing quantity of a secondary stabilizer, and an effective amount, sufficient to color the article, but less than 2 phr, of an azo or disazo pigment so as to produce an azo-pigmented article when exposed to sunlight, of a combination of two primary stabilizers substantially free of secondary stabilizers, including (a) a substantially oxo-piperazinyl triazine (PIP-T) having a structure selected from the group consisting of

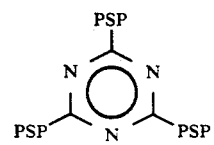

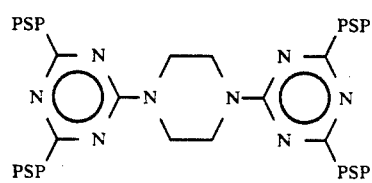

wherein PSP is a substituent having a formula selected from the following

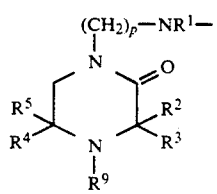

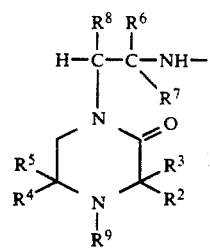

wherein, $R^1$ represents $C_1$-$C_{24}$ alkyl, $C_5$-$C_{20}$ cycloalkyl, $C_7$-$C_{20}$ araalkyl or alkaryl, $C_1$-$C_{24}$ aminoalkyl, or $C_6$-$C_{20}$ aminocycloalkyl;

$R^2$, $R^3$, $R^4$, and $R^5$ independently represent $C_1$-$C_{24}$ alkyl; and, $R^2$ with $R^3$, or $R^4$ with $R^5$ are cyclizable to $C_5$-$C_{12}$ cycloalkyl including the $C^3$ and $C^5$ atoms respectively, of the piperazin-2-one ring;

$R^6$ and $R^7$ independently represent $C_1$-$C_{24}$ alkyl, and polymethylene having from 4 to 7 carbon atoms which are cyclizable;

$R^8$ represents H, $C_1$-$C_6$ alkyl, and phenyl;

$R^9$ represents H and $C_1$-$C_3$ alkyl; and, p represents an integer in the range from 2 to about 10;

(b) a 3,5-di-substituted-4-hydroxybenzoate having the structure

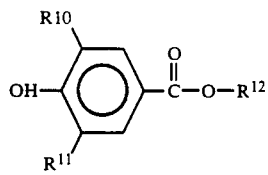

wherein $R^{10}$ and $R^{11}$ each represent $C_1$–$C_{12}$ alkyl, phenyl, naphthyl, $C_4$–$C_{12}$ cycloalkyl, and $C_1$–$C_8$ alkyl-substituted cycloalkyl, each alkyl substituent being $C_1$–$C_8$; and, $R^{12}$ represents a hydrocarbyl group selected from $C_{10}$–$C_{24}$ alkyl, $C_4$–$C_{12}$ cycloalkyl, $C_1$–$C_8$ alkyl-substituted cycloalkyl, and, 2,4-disubstituted phenyl wherein the substituents independently represent $C_1$–$C_{24}$ alkyl, $C_4$–$C_8$ cycloalkyl, and $C_1$–$C_8$ alkyl-substituted cycloalkyl.

21. The stabilizer system of claim 20 wherein said polyolefin is selected from the group consisting of a homopolymer of ethylene, a copolymer of ethylene with a minor amount by weight of propylene, a random or block copolymer (E-co-X) wherein E represents ethylene and X represents a minor amount by weight of a monoolefinically unsaturated monomer, a homopolymer of propylene, a copolymer of propylene with a minor amount of ethylene, and a random or block copolymer (P-co-X) wherein P represents propylene.

22. The stabilizer system of claim 21 comprising exposing said azo-pigmented polyolefin in a Xenon Arc Weather-O-Meter SAE J1885 test for a period sufficient to absorb 1240 Kjoules, and resulting in less color change than ±3; and, said PIP-T is specified by, $R^1$ being $C_3$–$C_{12}$ alkyl, and $C_6$–$C_7$ cycloalkyl;

$R^2$ and $R^3$ are each $C_1$–$C_3$ alkyl and together, when cyclized, represent cyclohexyl, methylcyclohexyl, or cycloheptyl;

$R^4$ with $R^5$, are each $C_1$–$C_3$ alkyl and together, when cyclized, represent cyclohexyl, methylcyclohexyl, or cycloheptyl; and, $R^9$ is hydrogen or methyl.

23. The stabilizer system of claim 22 wherein said 3,5-DHBZ is is represented by a structure selected from

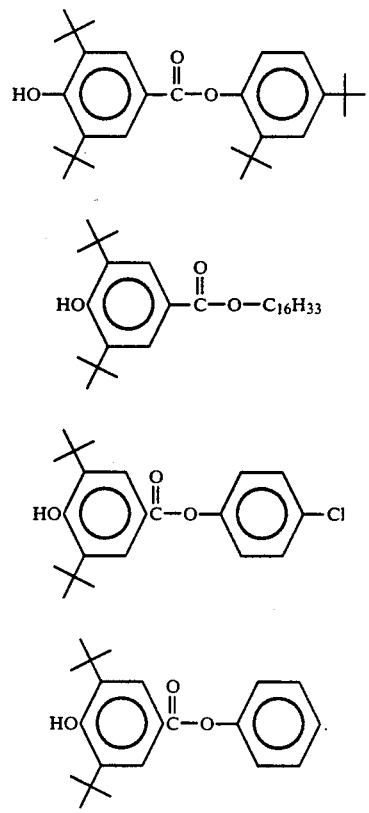

24. The stabilizer system of claim 23 wherein said azo or disazo pigment is Red 144, and shades thereof.

25. The stabilizer system of claim 24 wherein said azo or disazo pigment is present in an amount in the range from 20 ppm to about 1 phr; said PIP-T is present in an amount in the range from 20 ppm to about 2 phr; and, said 3,5-DHBZ is present in an amount in the range from 20 phr to about 2 phr; based on the weight of said polyolefin.

26. The stabilizer system of claim 25 wherein said stabilizer system is formed by melt-extruding said polyolefin, and said melt includes a secondary stabilizer present in no more than a melt-stabilizing amount, no more than 0.1 phr.

27. The stabilizer system of claim 26 wherein said polyolefin is selected from polypropylene homopolymer and a copolymer of propylene with a minor amount of ethylene; and, said secondary stabilizer is selected from a hindered phenol and a phosphite.

* * * * *